United States Patent
Tsuji

(10) Patent No.: US 6,868,168 B2
(45) Date of Patent: Mar. 15, 2005

(54) LANE RECOGNITION SYSTEM FOR VEHICLE

(75) Inventor: Masafumi Tsuji, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 643 days.

(21) Appl. No.: 10/021,074

(22) Filed: Dec. 19, 2001

(65) Prior Publication Data

US 2002/0081001 A1 Jun. 27, 2002

(30) Foreign Application Priority Data

Dec. 26, 2000 (JP) .................................. 2000-395096

(51) Int. Cl.[7] .............................................. G06K 9/00
(52) U.S. Cl. ..................... 382/104; 340/933; 348/113
(58) Field of Search .......................... 382/104; 340/435, 340/436, 438, 907, 933, 937, 985; 348/113, 116, 148; 701/23, 117, 301

(56) References Cited

U.S. PATENT DOCUMENTS

| 5,650,944 A | * | 7/1997 | Kise | ............................ 700/304 |
| 6,370,261 B1 | * | 4/2002 | Hanawa | ....................... 382/104 |
| 6,493,458 B2 | * | 12/2002 | Yasui et al. | .................. 382/104 |
| 6,807,287 B1 | * | 10/2004 | Hermans | ..................... 382/104 |
| 6,813,370 B1 | * | 11/2004 | Arai | ........................... 382/104 |

FOREIGN PATENT DOCUMENTS

| JP | 5-314396 | 11/1993 |
| JP | 8-5388 | 1/1996 |
| JP | 11-296660 A | 10/1999 |

* cited by examiner

*Primary Examiner*—Bhavesh M. Mehta
*Assistant Examiner*—Abolfazl Tabatabai
(74) *Attorney, Agent, or Firm*—Foley & Lardner LLP

(57) ABSTRACT

A lane recognition system for a vehicle is comprised of a camera set, a memory and a controller connected to the camera set and the memory. The camera set picks up a road image of a road ahead of the vehicle, and the memory stores parameters representative of a model lane marker of the road image. The controller is arranged to set a plurality of lane-marker detecting areas on the road image so that each lane-marker detecting area is partially overlapped with the lane-marker detecting areas adjacent to the one of the lane-marker candidate-point detecting areas, to detect each lane marker candidate point in each lane-marker detecting area, to calculate variations of the parameters, to correct the parameters according to the variation, and to output road-shape indicative information on the basis of the parameters.

15 Claims, 3 Drawing Sheets

LANE RECOGNITION SYSTEM FOR VEHICLE

BACKGROUND OF THE INVENTION

The present invention relates to a lane recognition system which recognizes lane makers on a traveling road of a vehicle.

Japanese Patent Provisional Publication No. 5-314396 discloses a lane-marker recognizing and tracking system in which a plurality of lane-marker detecting areas are defined in an image showing a road ahead of a vehicle in order to detect lane markers.

SUMMARY OF THE INVENTION

However, this system yet has a problem to be solved in order to further accurately and quickly detect the lane markers.

It is therefore an object of the present invention to provide a lane recognition system which is capable of executing a lane recognition process while maintaining a detection accuracy and shortening a processing time.

An aspect of the present invention resides in a lane recognition system which is for a vehicle and comprises a camera set, a memory and a controller. The camera set picks up a road image of a road ahead of the vehicle. The memory stores parameters representative of a model lane marker of the road image. The controller is coupled to the camera set and the memory. The controller is arranged to set a plurality of lane-marker candidate-point detecting areas on the road image so that each one of the lane-marker candidate-point detecting areas is partially overlapped with the lane-marker candidate-point detecting areas adjacent to the one of the lane-marker candidate-point detecting areas, to detect each lane marker candidate point in each lane-marker candidate-point detecting area, to calculate variations of the parameters by comparing the lane marker candidate points with corresponding points on the model lane marker derived from the parameters stored in the memory, to correct the parameters according to the variation, and to output road-shape indicative information on the basis of the parameters.

Another aspect of the present invention resides in a method for recognizing a lane traveled by a vehicle. The method comprises a step for picking up a road image of a road ahead of the vehicle; a step for storing parameters of a model lane marker of the road image; a step for setting a plurality of lane-marker candidate-point detecting areas on the road image so that each one of the lane-marker candidate-point detecting areas is partially overlapped with the lane-marker candidate-point detecting areas adjacent to the one of the lane-marker candidate-point detecting areas; a step for detecting each lane marker candidate point in each lane-marker candidate-point detecting area; a step for calculating variations of the parameters by comparing the lane marker candidate points with corresponding points on the model lane marker derived from the parameters stored in a memory; a step for correcting the parameters according to the variation; and a step for outputting road-shape indicative information on the basis of the parameters.

DETAILED DESCRIPTION OF THE INVENTION

Referring to FIGS. 1 to 4, there is shown an embodiment of a lane recognition system S according to the present invention.

Figure 1:
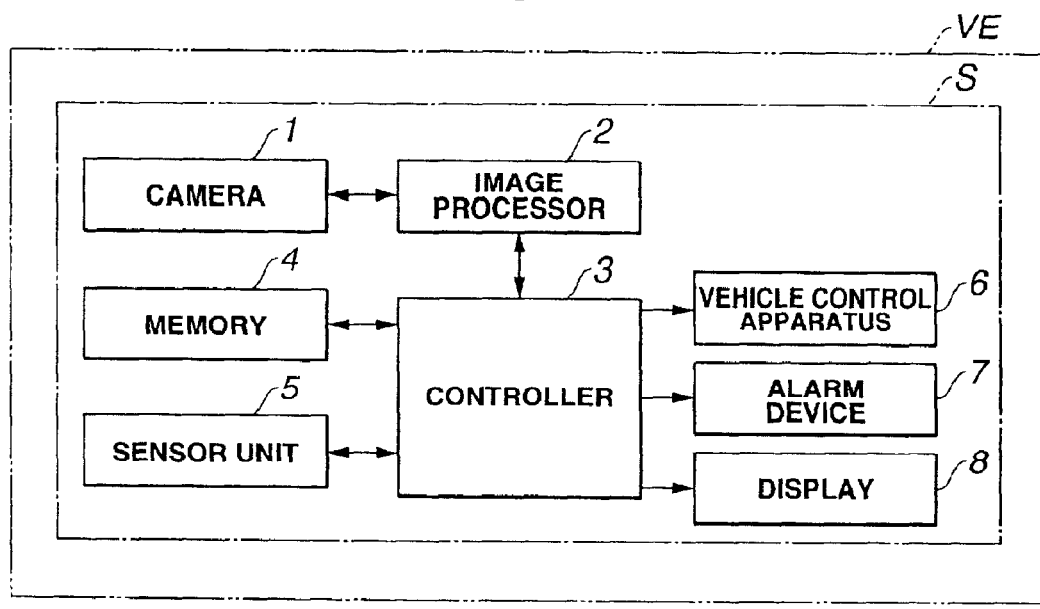
FIG. 1 is a schematic view showing a first embodiment of a lane recognition system according to the present invention.

As shown in FIG. 1, the lane recognition system S is installed to a vehicle VE, and comprises a camera 1, an image processor 2, a controller 3, a memory 4, a sensor unit 5, a vehicle control apparatus 6, an alarm device 7 and a display 8.

Controller 3 is basically constituted by a microcomputer, and is coupled to image processor 2, memory 4 and sensor unit 5 so as to interactively communicate with each other. Controller 3 is further coupled to vehicle control apparatus 6, alarm device 7 and display 8 so as to output command signals thereto, respectively, and is further coupled to camera 1 through image processor 2.

Figure 2:
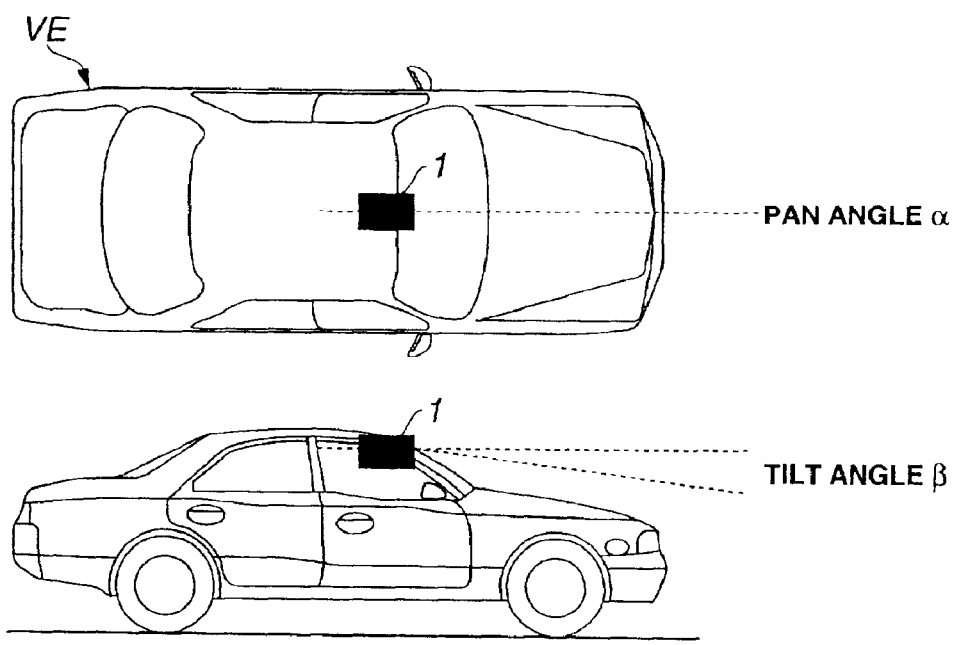
FIG. 2 is an explanatory view showing an installation position of a camera employed in the lane recognition system of FIG. 1.

Camera 1 is installed in a passenger compartment of vehicle VE. More specifically, camera 1 is installed at an upper and laterally center position of a front window in a passenger compartment as shown in FIG. 2 so that a pan angle α between an optical axis of a lens of camera 1 and a longitudinal center axis of vehicle VE is zero and a tilt angle β of camera 1 is β. Camera 1 picks up an image of a road view ahead of vehicle VE. Image processor 2 is coupled to camera 1 and receives data of the image picked up by camera 1. Image processor 2 processes the image in order to detect lane markers of a traveling lane and sends the processed image data to controller 3.

Controller 3 transforms a shape of lane markers into a mathematical model by using a plurality of parameters representative of a road shape and a vehicle behavior. By updating the parameters so as to correspond the detection result of the lane markers with model lane markers, controller 3 detects the actual lane markers and recognizes the road shape ahead of vehicle VE. Further, controller 3 corrects a position of a vanishing point 9 at which the two lane markers cross with each other, on the basis of the yaw angle and the pitch angle of vehicle VE relative to the road.

Memory 4 is a storage device for storing the parameters of the road model and the like. Sensor unit 5 detects a vehicle speed and a steering angle of vehicle VE. Vehicle control apparatus 6 executes a steering control, an acceleration control and a brake control according to command signals outputted from controller 3.

In this lane recognition system S according to the present invention, as shown in FIG. 5, camera 1 and image processor 2 functions as an image pickup means. Memory functions as a road shape storing means. Controller 3 functions as a coordinate transforming means, a lane-marker candidate-point detecting area setting means, a lane-marker candidate-point detecting means, a parameter variation calculating means, a parameter updating means and an output signal selecting means.

Figure 3:
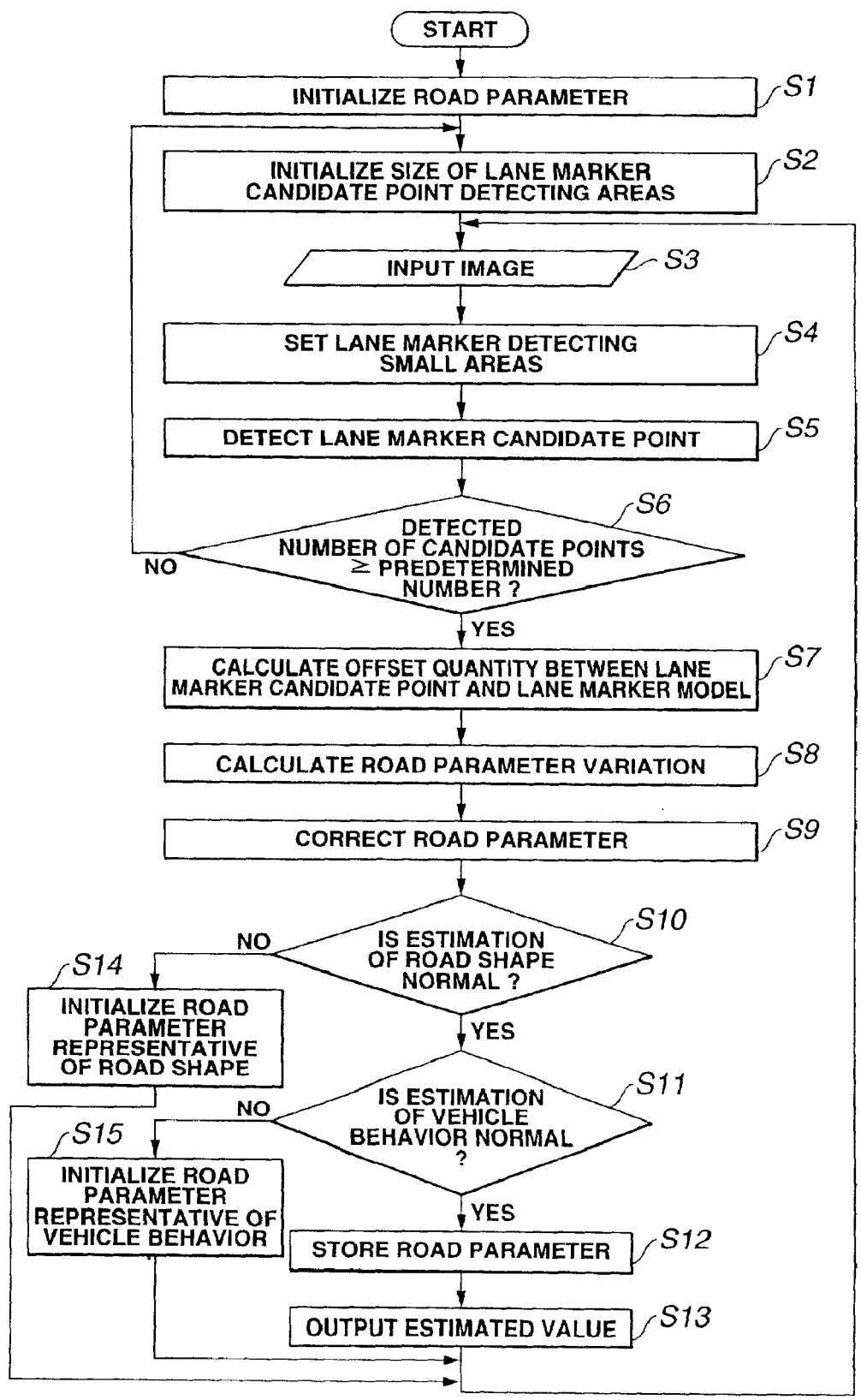
FIG. 3 is a flowchart showing a lane marker detecting process employed in the embodiment according to the present invention.

A flowchart of FIG. 3 shows a procedure of a lane marker detecting process executed by controller 3.

At step S14, controller 3 initializes the parameters representative of the road shape and the vehicle behavior.

Hereinafter, these parameters are called road parameters. A road coordinate system representing an actual space ahead of the vehicle is transformed into an x-y image-plane coordinate system shown in FIG. 4. In this x-y image-plane coordinate system, model lane markers 12 are represented by the following equation (1) using the road parameters.

$$x=(a+ie)(y-d)+b/(y-d)+c \quad (1)$$

where a, b, c, d and e are the road parameters, and i is 1 and 0. Assuming that a vertical dimension between camera 1 and a road surface is constant, road parameter a denotes a lateral displacement of vehicle VE between the lane markers, b denotes a road curvature, c denotes a yaw angle of vehicle VE (the optical axis of camera 1) relative to the road, d denotes a pitch angle of vehicle VE (the optical axis of camera 1) relative to the road, and e denotes a lane width between the lane markers. Further, c includes a pan angle $\alpha$ within an installation angle between the host vehicle and camera 1, and d includes a tilt angle $\beta$ within an installation angle between the host vehicle and camera 1.

Under the initial condition, the shape of the road and the lane markers and the vehicle behavior are set at values corresponding to center values, respectively, since the shape of the road and the lane markers and the vehicle behavior are not clear in this initial condition. More specifically, the lateral displacement a of vehicle VE within the lane markers is set at a center between the lane markers, the road curvature b is set at zero (straight), the yaw angle c relative to the lane markers is set at pan angle $\alpha$, the pitch angle d relative to the lane markers is set at tilt angle $\beta$ under the vehicle stop condition, and lane width e between the lane markers is set at a lane width of a highway representatively defined by the rule of a road structure.

Further, the road parameters may be initialized on the basis of values representative of the vehicle behavior detected by sensor unit 5. More specifically, when the steering wheel is being turned to right or left under the initial condition, it may be determined that vehicle VE travels on a curved road of a radius corresponding to the steering angle, and therefore the road curvature b may be set at a value corresponding to the steering angle.

Figure 4:
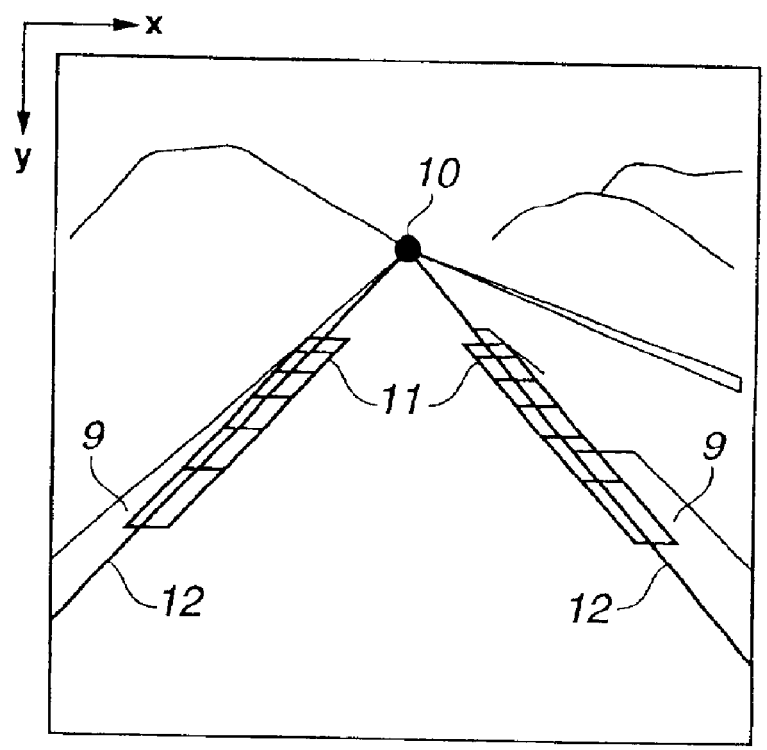
FIG. 4 is a view showing a vanishing point 10, model lane markers 12 and lane-marker candidate-point detecting areas 11 in an image picked up by the camera.

At step S2, controller 3 initializes small areas for detecting a candidate lane marker as shown in FIG. 4. Under the initial condition, since it is supposed that there is a large difference between the model lane markers obtained by inputting the initial values into the respective road parameters a to e and the actual lane markers on the image plane, it is preferable that the lane-marker candidate-point detecting areas are set as large as possible. As shown in FIG. 4, in this embodiment twelve detecting areas including six right detecting areas and six left detecting areas are set to detect right and left lane markers 9. If lane markers 9 have been detected already in the previous process, the size of each the lane-marker candidate-point detecting area is set small so as to lower the possibility of erroneous detection of other object as a lane marker. Further this small setting improves the processing speed of this process.

At step S3, controller 3 receives the image data which image processor 2 obtains by processing the image picked up by camera 1.

At step S4, controller 3 sets the lane-marker candidate-point detecting areas on the road image received from image processor 2. During this setting, the lane-marker candidate-point detecting areas are set so that the model lane markers are located at centers of the respective lane-marker candidate-point detecting areas, on the basis of the lane-marker candidate-point detecting areas calculated at step S2 and the model lane markers obtained from the road parameters calculated at step S1 or steps S12, S14 and S15. It will be understood that the lane-marker candidate-point detecting areas may be set at positions offset from the model lane markers according to the change of the past model lane markers. More specifically, in order to correspond the y-coordinate of a start point of each lane-marker candidate-point detecting area with the y-coordinate of an end point of the previous lane-marker candidate-point detecting area, each lane-marker candidate-point detecting area is set so that the y-coordinate of each lane-marker candidate-point detecting area is overlapped with the y-coordinate of the adjacent lane-marker candidate-point detecting area by a line.

At step S5, controller 3 detects the lane marker candidate point in each lane-marker candidate-point detecting area. In this detecting operation, a differential image is produced by filtering the input image with the Sobel filter. Then, controller 3 counts suitable pixels of each line segment connecting a point on an upper base line and a point on a lower base line of each detecting area. The suitable pixel is a pixel which is located on the line segment and whose density is greater than a predetermined value capable of extracting the detection line. Further, a line segment, which has the largest number of the suitable pixels, is selected from all line segments in each detecting area and is determined as a detected straight line. The coordinate of the start point of the detected straight line is outputted as an output value of the lane marker candidate point.

When the number of the suitable pixels of the determined detection straight line is smaller than a predetermined rate of the maximum number of pixels corresponding to the length of the detecting area, controller 3 determines that there is no lane marker candidate point in this detecting area.

For example, under a condition that the number of pixels corresponding to the length of the detecting area is fifteen and the predetermined rate is ½, if the number of the suitable pixels of the detection straight line are seven or less, controller 3 determines that there is no lane marker candidate point in this detection area. If the number of the suitable pixels of the detection straight line segment is nine, controller 3 determines that there is a lane marker candidate point in this detecting area. Controller 3 treats the coordinate of the start of the selected line segment as the line marker candidate points in this detecting area and stores the coordinate of the end of the selected line segment is stored. The start point of the selected line segment corresponds to a point of the upper base line of the line-marker candidate-point detecting area, and the end point of the selected line segment corresponds to a point of the lower base line of the line-marker candidate-point detecting area.

The above operation of determining the lane-marker candidate points is executed by each lane-marker candidate-point detecting area from the far side to the near side of the road image in turn.

In determining the lane-marker candidate points, the predetermined rate relative to the length of the lane-marker candidate-point detecting area may be set at a constant rate throughout all detecting areas or may be varied by each detecting area. Further the predetermined value of the density may be set at a constant value throughout all detecting areas or may be varied by each detecting area.

When the lane-marker candidate point is not detected by the execution of the above-discussed processing, the detection result of the end point of the previous lane marker candidate point detecting area is outputted as the start point of the present area in which the lane marker candidate point is not detected.

Although the coordinate at the point on the upper base line in the lane-marker candidate-point detecting area is employed as the output result of the lane marker candidate point and the processing of each lane-marker candidate-point detecting area is executed in turn from the far side to the near side, it will be understood that the present invention is not limited to this. Instead of the coordinate of the upper base line, the coordinate of the lower base line of each lane-marker candidate-point detecting area may be employed as an output result of the lane-marker candidate point. Further, the processing order of the lane-marker candidate-point detecting areas may be changed so that the operation is executed from the near side to the far side.

At step S6, controller 3 checks whether or not the number of the lane-marker candidate points of the whole lane-marker candidate-point detecting area is greater than or equal to a predetermined value agreeable to decide the line obtained from the lane-marker candidate points as a lane marker. When the number of the lane marker candidate points is smaller than the predetermined value, controller 3 determines that there is no lane marker in the detecting areas, and the routine of this flowchart returns to step S2 to again initialize the size of the detecting area. When the number of the lane-marker candidate points is greater than or equal to the predetermined value, the routine proceeds to step S7.

At step S7, controller 3 calculates an offset quantity between the determined lane-marker candidate point and a point on the model lane marker obtained by the previous processing by each lane-marker candidate point.

At step S8, controller 3 calculates variations $\Delta a$, $\Delta b$, $\Delta c$, $\Delta d$ and $\Delta e$ of the road parameters a to e on the basis of the respective offset quantities of the lane-marker candidate points. The calculation of the variations $\Delta a$ to $\Delta e$ may be executed on the basis of a least-square method, for example, disclosed in Japanese Patent Provisional Publication No. 8-5388.

At step S9, controller 3 corrects road parameters a to e on the basis of variations $\Delta a$ to $\Delta e$ calculated at step S8. When the model lane marker expressed by the equation (1) is employed, the correction of road parameters a to e is executed by using the following equations (2).

$$a=a+\Delta a,\ b=b+\Delta b,\ c=c+\Delta c,$$

$$d=d+\Delta d,\ e=e+\Delta e \qquad (2)$$

At step S10 following the execution of step S9, controller 3 determines whether or not an-estimation of the road shape is normal. More specifically, controller 3 determines whether or not the road parameter representative of the road shape is normal. When the determination at step S10 is negative, the routine proceeds to step S14 wherein controller 3 initializes the road parameter representative of the road shape. In the equation (1), parameter b represents the road curvature, and parameter e represents the road width. Accordingly, when it is determined on the basis of the vehicle behavior indicative value detected by sensor unit 5 that the road curvature estimated from parameter b is never generated at the traveling road, parameter b is initialized. Similarly, when it is determined on the basis of the vehicle behavior indicative value detected by sensor unit 5 that the road width estimated from parameter e is never generated on the traveling road, parameter e is initialized.

When the determination at step S10 is affirmative, the routine proceeds to step S11 wherein it is determined whether or not an estimation of the vehicle behavior is normal. That is, it is determined at step S11 whether or not the road parameter representative of the vehicle behavior is normal.

When the determination at step S11 is negative, the routine proceeds to step S15 wherein controller 3 initializes the road parameter representative of the vehicle behavior. In the equation (1) representative of the lane marker model, parameter a represents the lateral displacement within the lane, parameter c represents the yaw angle relative to the road surface, parameter d represents the pitch angle relative to the road surface. Accordingly, when it is determined on the basis of the vehicle behavior indicative value detected by sensor unit 5 that the lateral displacement estimated from parameter a is never generated on the actual traveling road, parameter a is initialized. Similarly, when it is determined on the basis of the vehicle behavior indicative value detected by sensor unit 5 that the yaw angle estimated from parameter c is never generated on the actual traveling road, parameter c is initialized. Further, when it is determined on the basis of the vehicle behavior indicative value detected by sensor unit 5 that the pitch angle estimated from parameter d is never generated on the actual traveling road, parameter d is initialized.

At step S12 following the affirmative determination at step S11, controller 3 stores the road parameters a to e corrected at step S9 as road parameters of the lane marker model in memory 4.

At step S13, controller 3 estimates the road shape from the new road parameters, and outputs the command signal according to the estimated road shape to vehicle control apparatus 6, alarm device 7 and display 8.

Following the execution of step S13, S14 or S15, the routine returns to step S3.

With the thus arranged lane recognition system S according to the present invention, the lane-marker candidate-point detecting area is set so that a part of the lane-marker candidate-point detecting area is overlapped with the adjacent upper and lower lane-marker candidate-point detecting areas. This enables the road information to be commonly and continuously utilized, and this facilitates the detection of the lane marker candidate points in the continuous lane-marker candidate-point detecting areas.

Further, since the overlapped arrangement of the detecting areas facilitates the comparison between the two detection results of the adjacent detecting areas, the detection accuracy of a curved road is improved.

Furthermore, the present invention is arranged such that the coordinates of the overlapped other detecting area is employed as a detection result of the objective detecting area when no candidate point is detected at the objective detecting area. This arrangement enables an interpolation during the no candidate point condition to be facilitated. Further, this arrangement improves the detection accuracy of the lane marker during the traveling on a curved road as compared with the general interpolation.

This application is based on a prior Japanese Patent Application No. 2000-395096 filed on Dec. 26, 2000 in Japan. The entire contents of this Japanese Patent Application are hereby incorporated by reference.

Although the invention has been described above by reference to a certain embodiment of the invention, the invention is not limited to the embodiments described above. Modifications and variations of the embodiment described above will occur to those skilled in the art, in light of the above teaching. The scope of the invention is defined with reference to the following claims.

What is claimed is:

1. A lane recognition system for a vehicle, comprising:
a camera set picking up a road image of a road ahead of the vehicle;
a memory storing parameters representative of a model lane marker of the road image; and
a controller coupled to the camera set and the memory, the controller being arranged,
to set a plurality of lane-marker candidate-point detecting areas on the road image so that each one of the lane-marker candidate-point detecting areas is partially overlapped with the lane-marker candidate-point detecting areas adjacent to the one of the lane-marker candidate-point detecting areas, to detect each lane marker candidate point in each lane-marker candidate-point detecting area, to calculate variations of the parameters by comparing the lane marker candidate points with corresponding points on the model lane marker derived from the parameters stored in the memory, to correct the parameters according to the variation, to output road-shape indicative information on the basis of the parameters.

2. The lane recognition system as claimed in claim 1, wherein the controller sets each lane-marker candidate-point detecting area so that in an x-y coordinate system of the road image, the y-coordinate of each lane-marker candidate-point detecting area is overlapped with the y-coordinate of the adjacent lane-marker candidate-point detecting area by a line.

3. The lane recognition system as claimed in claim 1, wherein the variations calculated by the controller includes a variation of a road curvature and a displacement of the camera set relative to a reference position.

4. The lane recognition system as claimed in claim 1, further comprising a sensor unit that detects a behavior of the vehicle and a vehicle control apparatus that controls the vehicle according to a command signal outputted from the controller.

5. The lane recognition system as claimed in claim 4, wherein when the controller determines that the corrected parameters are normal based on the result of comparing information derived from the corrected parameters with the vehicle behavior detected by the sensor unit, the controller updates the parameters in the memory are updated.

6. The system as claimed in claim 4, wherein the controller is further arranged to obtain a coordinate of each lane-marker candidate-point detecting area by transforming a coordinate system of the road ahead of the vehicle into a coordinate system of the road image, and to detect a coordinate of each lane marker candidate point in the coordinate system of the road image.

7. The system as claimed in claim 4, wherein the controller is further arranged to detect the lane marker candidate point in each lane-marker candidate-point detecting area by selecting a lane-marker indicative straight line element between a first point on an upper side of each lane-marker candidate-point detecting area and a second point on an lower side of each lane-marker candidate-point detecting area and by determining one of the first and second points as a lane-marker candidate point of each lane-marker candidate-point.

8. The system as claimed in claim 7, wherein the controller is further arranged to output the variation indicative of a displacement of the vehicle relative to a reference point of the road to the vehicle control apparatus.

9. The system as claimed in claim 7, wherein the controller is further arranged to adjust the second point of the lane-marker candidate-point detecting area with a first point of the adjacent lane-marker candidate-point detecting area adjacent to the lane marker candidate point.

10. The system as claimed in claim 1, wherein when the lane markers are recognized as a pair of lane markers for defining a lane, each of the lane-marker candidate-point detecting areas of each lane marker is overlapped with the adjacent lane-maker candidate-point detecting areas by a line.

11. The system as claimed in claim 1, wherein when the controller detects no candidate point at one of the lane-marker candidate-point detecting areas, the controller calculates the candidate point of the one of the lane-marker candidate-point detecting areas on the basis of the adjacent lane-marker candidate-point detecting areas adjacent to the one of the lane-marker candidate-point detecting area.

12. The lane recognition system as claimed in claim 1, wherein the controller sets the lane-marker candidate-point detecting areas so that the model lane markers are located at centers of the respective lane-marker candidate-point detecting areas.

13. The lane recognition system as claimed in claim 1, wherein the controller sets the lane-marker candidate-point detecting areas at positions offset from the model lane marker according to the change of the past model lane marker.

14. A method for recognizing a lane traveled by a vehicle, the method comprising:

picking up a road image of a road ahead of the vehicle;

storing parameters of a model lane marker of the road image;

setting a plurality of lane-marker candidate-point detecting areas on the road image so that each one of the lane-marker candidate-point detecting areas is partially overlapped with the lane-marker candidate-point detecting areas adjacent to the one of the lane-marker candidate-point detecting areas;

detecting each lane marker candidate point in each lane-marker candidate-point detecting area;

calculating variations of the parameters by comparing the lane marker candidate points with corresponding points on the model lane marker derived from the parameters stored in a memory;

correcting the parameters according to the variation; and outputting road-shape indicative information on the basis of the parameters.

15. A lane recognition system installed on a vehicle, comprising:

image pickup means for picking up an image of a predetermined region ahead of the vehicle;

storing means for storing parameters of a model lane marker;

coordinate transforming means for obtaining a coordinate of each lane-marker candidate-point detecting area by transforming a coordinate system of the road ahead of the vehicle into a coordinate system of the road image;

lane-marker candidate-point detecting area setting means for setting a plurality of lane-marker candidate-point detecting areas on the image to detect a lane marker of a lane traveled by the vehicle;

lane-marker candidate-point detecting means for detecting a coordinate of each lane-marker candidate-point in each lane-marker candidate-point detecting area;

variation calculating means for calculating variations of the parameters representative of the road shape and a position of the image pickup means relative to the road ahead of the vehicle by comparing the coordinate of the lane marker candidate point and a coordinate of a point of the road model in the coordinate system of the image;

parameter updating means for updating the parameters stored in the storing means according to the variations of the parameters; and output signal selecting means for outputting a displacement of the vehicle relative to the road to a vehicle control apparatus;

wherein the lane-marker candidate-point detection area setting means sets the lane-marker candidate-point detection areas so that a part of each lane-marker candidate-point detection area is overlapped with adjacent one of the lane-marker candidate-point detection areas;

wherein the lane-marker candidate-point detecting means detects a straight line element of the lane marker on the basis of a coordinate of a first point set at a position of one of upper and lower sides of the lane-marker candidate-point detecting area and a coordinate of a second point set at a position of the other of the upper and lower sides of the lane-marker candidate-point detecting area;

wherein the lane-marker candidate-point detecting means outputs the point corresponding to one of the upper and lower sides of the lane-marker candidate-point detecting area as a lane-marker candidate point.

* * * * *